J. W. MARTIN.
DOUGH-RAISER.

No. 191,986.

Patented June 12, 1877.

WITNESSES
Henry N. Miller
Harry Toulman

INVENTOR
John D. Martin
Alexander & Mason
ATTORNEYS.

UNITED STATES PATENT OFFICE.

JOHN W. MARTIN, OF ALLIANCE, OHIO, ASSIGNOR OF ONE-HALF HIS RIGHT TO GEORGE BURGERT, OF SAME PLACE.

IMPROVEMENT IN DOUGH-RAISERS.

Specification forming part of Letters Patent No. 191,986, dated June 12, 1877; application filed October 28, 1876.

*To all whom it may concern:*

Be it known that I, JOHN W. MARTIN, of Alliance, in the county of Stark and State of Ohio, have invented certain new and useful Improvements in Dough-Troughs; and I do hereby declare the following to be a full, clear, and exact description thereof, reference being had to the accompanying drawing, and to the letters of reference marked thereon.

The nature of my invention consists in the construction and arrangement of a dough-trough, composed of two metallic vessels, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
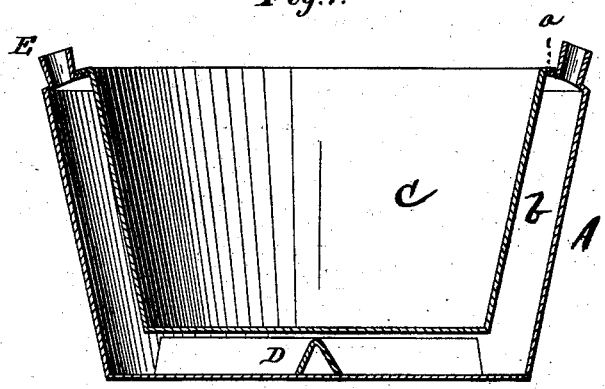
Figure 2:
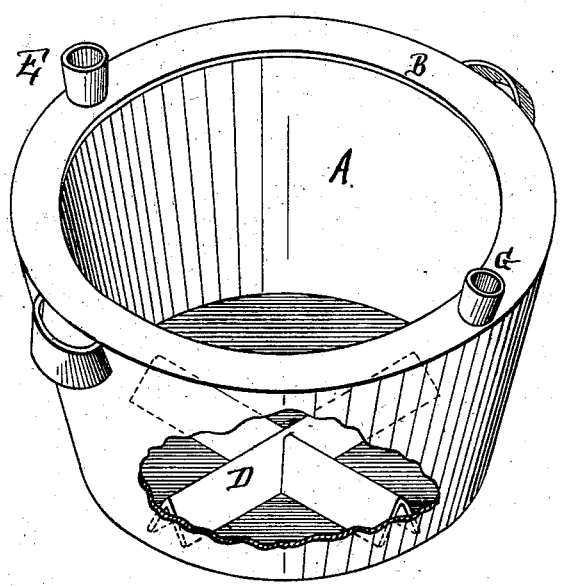

Figure 1 is a central vertical section of my dough-trough. Fig. 2 is a perspective view of the outer vessel, with a part of the side broken open to show the interior thereof.

A represents a metallic vessel, of any suitable form and size, having its sides made flaring, more or less, as may be desired. Around the upper edges of this vessel is an inwardly-projecting flange, B, of suitable width, made, preferably, slightly inclined upward, as shown.

C represents the interior vessel, made of corresponding form, and as much smaller in size that it can be passed down into the exterior vessel A, within the flange B. The upper edges of the interior vessel C are turned outward, forming a flange, $a$, to rest upon the flange B of the exterior vessel.

The bottom of the interior vessel C rests upon ribs D D, formed upon or attached to the bottom of the vessel A, so that said vessel C will have a firm support and yet leave a space between the bottoms of the two vessels, as well as all around the sides.

In this space $b$ is poured hot water, through an inlet, E, in the flange B, for the purpose of causing the dough to rise more rapidly and thoroughly. In said flange B is also a vent, G, for the escape of steam.

The two vessels A and C are disconnected from each other, and can easily be separated when it is desired to use them for other purposes, and, being made of metal, they are easily cleaned.

I am aware that dough-troughs have been made with surrounding hot-water chambers; hence I do not claim such, broadly, as being my invention.

Having thus fully described my invention, what I claim as new, and desire to secure by Letters Patent, is—

The combination of the exterior metallic vessel A, provided with ribs D on its bottom and at the top with the inwardly-projecting flange B, and the interior metallic vessel C, having at the top the outwardly-projecting flange $a$, all substantially as and for the purposes herein set forth.

JOHN W. MARTIN.

Witnesses:
J. F. DUTTON,
S. V. ESSICK.